(12) United States Patent
Klemba et al.

(10) Patent No.: US 7,305,459 B2
(45) Date of Patent: Dec. 4, 2007

(54) WIRELESS SERVICE POINT NETWORKS

(75) Inventors: Keith Stuart Klemba, Palo Alto, CA (US); Isaac Robert Nassi, Los Gatos, CA (US); David Neil Cornejo, Honolulu, HI (US); Lawrence Alan Rosenthal, Berkeley, CA (US)

(73) Assignee: Firetide, Inc., Los Gatos, CA (US)

( * ) Notice: Subject to any disclaimer, the term of this patent is extended or adjusted under 35 U.S.C. 154(b) by 451 days.

(21) Appl. No.: 10/426,125

(22) Filed: Apr. 28, 2003

(65) Prior Publication Data

US 2004/0215687 A1    Oct. 28, 2004

(51) Int. Cl.
G06F 15/177    (2006.01)

(52) U.S. Cl. .................... 709/220; 709/249

(58) Field of Classification Search ............ 709/227, 709/200, 220, 249; 380/270; 370/338, 465, 370/475; 455/432.2; 342/359
See application file for complete search history.

(56) References Cited

U.S. PATENT DOCUMENTS

| | | | |
|---|---|---|---|
| 5,371,734 A | | 12/1994 | Fischer |
| 6,201,962 B1 * | | 3/2001 | Sturniolo et al. ......... 455/432.2 |
| 6,314,126 B1 | | 11/2001 | Schilling et al. |
| 6,349,210 B1 | | 2/2002 | Li |
| 6,493,377 B2 | | 12/2002 | Schilling et al. |
| 6,512,784 B2 | | 1/2003 | Schilling |
| 6,590,928 B1 | | 7/2003 | Haartsen |
| 6,625,169 B1 | | 9/2003 | Tofano |
| 6,633,757 B1 | | 10/2003 | Hermann et al. |
| 6,640,087 B2 | | 10/2003 | Reed et al. |
| 6,707,425 B2 * | | 3/2004 | Louhi ......................... 342/359 |
| 6,721,805 B1 | | 4/2004 | Bhagwat et al. |
| 6,744,753 B2 * | | 6/2004 | Heinonen et al. ........... 370/338 |
| 6,754,188 B1 | | 6/2004 | Garahi et al. |
| 6,763,013 B2 | | 7/2004 | Kennedy |

(Continued)

FOREIGN PATENT DOCUMENTS

WO    WO 2004/100424 A3    11/2004

(Continued)

OTHER PUBLICATIONS

Arbaugh et al. "Your 802.11 wireless network has no clothes" 2002 IEEE, pp. 44-51.*

(Continued)

*Primary Examiner*—Van H. Nguyen
(74) *Attorney, Agent, or Firm*—PatentVentures: Bennett Smith

(57) ABSTRACT

System, apparatus, and methods are disclosed wherewith a group of independent wireless routing devices known as Service Points work cooperatively to form an ad hoc mesh communication network. The resulting Service Point Network is used to provide reliable address-directed communication services between devices attached by conventional means (wired or wireless) to respective Service Ports on any of the Service Points. Attached Utilizing Devices are not considered a part of the Service Point Network and need not contain any custom software or hardware related to the operations of the Service Point Network. Consequently, the networking technology used to form the Service Point Network is independent of the technology used for connecting devices to Service Points. Services for Utilizing Devices include both point-to-point as well as point-to-multi-point communication.

43 Claims, 13 Drawing Sheets

U.S. PATENT DOCUMENTS

| | | | |
|---|---|---|---|
| 6,771,666 B2 * | 8/2004 | Barker, Jr. | 370/475 |
| 6,842,460 B1 * | 1/2005 | Olkkonen et al. | 370/465 |
| 2001/0040895 A1 | 11/2001 | Templin | |
| 2002/0012320 A1 | 1/2002 | Ogier et al. | |
| 2002/0062388 A1 | 5/2002 | Ogier et al. | |
| 2003/0095504 A1 | 5/2003 | Ogier | |
| 2004/0032835 A1 | 2/2004 | Majidi-Ahy et al. | |
| 2004/0090943 A1 * | 5/2004 | da Costa et al. | 370/338 |

FOREIGN PATENT DOCUMENTS

| | | |
|---|---|---|
| WO | WO 2004/100425 A3 | 11/2004 |

OTHER PUBLICATIONS

Sheu et al. "Dynamic access point approach (DAPA) for IEEE 802.11 wireless LANs" 1999 IEEE, pp. 2646-2650.*

Whitehead "RAWCON 2000: mesh networks; a new architecture for broadband wireless access systems" 2000 IEEE, pp. 43-46.*

Jorjeta G. Jetcheva, et al.; Design and Evaluation of a Metropolitan Area Multitier Wireless Ad Hoc Network Architecture; Proceedings of the 5th IEEE Workshop on Mobile Computing Systems and Applications (WMCSA 2003), IEEE, Monterey, CA, Oct. 2003, 12 pgs.

U.S. Appl. No. 09/728,192, inc by ref to US 2003/0095504 A1, published May 22, 2003.

Yih-Chun Hu, et al.; Efficient Security Mechanisms for Routing Protocols; Proceedings of the Tenth Annual Network and Distributed System Security Symposium (NDSS 2003), pp. 57-73, ISOC, San Diego, CA, Feb. 2003. 17 pgs. (Also see Cite No. C19).

David B. Johnson, et al.; The Dynamic Source Routing Protocol for Mobile Ad Hoc Networks; IETF MANET Working Group, Feb. 21, 2002, 85 pgs (pp. i-81).

Supratik Bhattacharyya, et al.; Geographical and Temporal Characteristics of Inter-POP Flows: View from a Single POP. European Transactions on Telecommunications (ETT), vol. 13, No. 1. pp. 5-22, Jan./Feb. 2002, 18 pgs.

U.S. Appl. No. 60/232,047, inc by ref to US 2002/0012320 A1, published Jan. 31, 2002.

U.S. Appl. No. 60/232,046, inc by ref to US 2002/0012320 A1, published Jan. 31, 2002.

U.S. Appl. No. 60/190,358, inc by ref to US 2002/0012320 A1, published Jan. 31, 2002.

U.S. Appl. No. 09/728,253, inc by ref to US 2001/0040895 A1, published Nov. 15, 2001.

Supratik Bhattacharyya, et al.; POP-Level and Access-Link-Level Traffic Dynamics in a Tier-1 POP. ACM SIGCOMM Internet Measurement Workshop (IMW), San Francisco, Nov. 2001, 15 pgs.

Jorjeta G. Jetcheva, et. al.; Adaptive Demand-Driven Multicast Routing in Multi-Hop Wireless Ad Hoc Networks. In proceedings of the ACM Symposium on Mobile Ad Hoc Networking and Computing (MobiHoc), Long Beach, CA, Oct. 2001, 12 pgs.

Ashwin Sridharan, et al.; On the Impact of Aggregation on the Performance of Traffic-Aware Routing. In proceedings of the 17th International Teletraffic Congress, Salvador da Bahia, Brazil, Sep. 2001, 13 pgs.

Nina Taft et al.; Understanding Traffic Dynamics at a Backbone POP. SPIE ITCOM + OPTICOMM Workshop on Scalability and Traffic Control in IP Networks, Denver, CO, Aug. 2001, 7 pgs.

Jorjeta G. Jetcheva, et. al.; A Simple Protocol for Multicast and Broadcast in Mobile Ad Hoc Networks, Jul. 20, 2001, 14 pgs. (pp. i-11).

Jorjeta G. Jetcheva, et. al.; The Adaptive Demand-Driven Multicast Routing Protocol for Mobile Ad Hoc Networks, Jul. 13, 2001, 67 pgs. (pp. i-63).

David A. Maltz, et al.; The Effects of On-Demand Behavior in Routing Protocols for Multi-Hop Wireless Ad Hoc Networks, IEEE Journal on Selected Areas in Communications Special Issue on Mobile and Wireless Networks, Aug. 1999, 20 pgs.

Bhargav Bellur and Richard G. Ogier; A Reliable, Efficient Topology Broadcast Protocol for Dynamic Networks; in IEEE Infocomm, pp. 178-186, IEEE, Mar. 1999. 9 pgs.

Josh Broch et al.; A Performance Comparison of Multi-Hop Wireless Ad Hoc Network Routing Protocols. Proceedings of the Fourth Annual ACM/IEEE International Conference on Mobile Computing and Networking, ACM, Dallas, TX, Oct. 1998, 13 pgs.

Yih-Chun Hu, et al.; Efficient Security Mechanisms for Routing Protocols; Feb. 2003. 17 pgs.

* cited by examiner

WIRELESS SERVICE POINT NETWORKS

FIELD OF INVENTION

This invention relates to wireless telecommunication networks, including particularly ad hoc mesh wireless networks.

BACKGROUND ART

Wireless Local Area Network (WLAN) technologies are rapidly making their way into all types of networks (e.g., home, SOHO, education, enterprise). Nearly all networking companies have been rapidly adding WLAN components to their product portfolio.

Governing this technology expansion are the IEEE 802.11 standards, currently the industry's choice for WLAN architecture compliance. While the standard defines alternative modes of operation, today it is the Infrastructure Mode that is most commonly deployed. In this mode a wireless Access Point ("AP") is attached to the LAN via an Ethernet cable and wireless Utilizing Devices associate with the AP to gain wireless access to the LAN. The wireless clients must be within radio range of an Access Point and be capable of passing any authentication screening the AP may deploy. Sufficient AP's must be deployed to insure radio coverage of the desired area and capacity for the desired number of clients, as each AP can only support a limited number of associated clients. FIG. 1 (prior art) thus illustrates how access to LAN server 100 and its services is extended one wireless radio hop to Utilizing Devices 120 by the deployment of APs 110.

Deploying a WLAN in this manner can require extensive site evaluation, security planning, and—as illustrated in FIG. 1—lots of wire. Thus, each of AP's 110(a)-(c) are connected via corresponding wires 105(a)-(c) to LAN 100. Moreover, some devices—such as computer server 130, printer 140, and projector 150 in the example of FIG. 1—may not be configured for association with AP's 110, resulting in yet additional wired 105 connections back to the LAN. The mobility afforded by the prior art environment of FIG. 1 is thus focused on accommodating limited motion by clients 120; however the Access Points 110 themselves, as well as servers and services e.g. 130, 140, and 150 are still stationary-wired LAN systems. This prior art design methodology has been instrumental in launching the WLAN revolution worldwide. There is, however, need for a new approach that will enable networking components to gain their freedom via wireless technologies, while continuing to adhere to established industry standards (particularly those governed by IEEE 802.11), and while preserving or even improving the ease and security with which mobile and other devices can access LAN resources.

SUMMARY OF THE INVENTION

Briefly, the present invention provides methods and apparatuses for accessing resources via a wireless communication network. The network is known as a Service Point Network ("SPN") and is a wireless network comprising multiple Service Points, each potentially connected to a Utilizing Device. Utilizing Devices are not part of the SPN, but connect to one or more Service Points and thereby access or provide resources via the SPN. In a further aspect of the invention, a first of the Utilizing Devices accesses a second via packets sent through the SPN between the Service Points connected to the two Utilizing Devices. The Service Points preferably communicate with each other using an ad hoc mesh network protocol that supports routing via unicast, multi-cast and/or broadcast. The SPN is ad hoc with respect to the number, location, environment surrounding the Service Points and connection of Utilizing Devices to the Service Points which are embodied in physically mobile nodes. The protocol employs an on-demand or proactive routing algorithm. Utilizing Devices are connected to the corresponding Service Points via wired or wireless connection.

Methods of the invention preferably include providing a first Utilizing Device access to a second Utilizing Device, without revealing to the Utilizing Devices the addresses of the connected Service Points. Instead, the Utilizing Device originating the message specifies the address of the intended destination Utilizing Device, and the SPN automatically maps the address to an identifier for the corresponding Service Point connected to the destination Utilizing Device. Aspects of the invention further include mapping the identifier to a network address of the Service Point, and dynamically remapping it to reflect any change of network address in the course of communication transmission.

In a further aspect of the present invention, the wireless SPN includes providing at least one private sub-net comprising a selected subset of the Service Points, each configured to only forward communications traffic that is either to or from other Service Points within the private sub-net. The method further includes automatic reorganization of the Service Point Network into sub-nets based on one or more of the following factors: routing, routing management, security management, frequency, authentication, density, identification, age and technologies.

In various embodiments, Utilizing Devices connected to Service Points provide a set of resources consisting of applications, printing, network gateway, DHCP, SMTP, vending/e-commerce, audio, imaging, lighting, utility, appliances, travel, communications, telematics and/or emergency safety. In further embodiments, a first Utilizing Device may access a second Utilizing Device selected, in part, based upon a topological relationship between the Service Points connected to the Utilizing Devices, and/or the physical location of the Service Point connected to the second Utilizing Device.

In another feature, the Service Points each include a Networking Port to wirelessly route multi-hop traffic to other Service Points, and a Service Port configured to communicate with one or more Utilizing Devices. A Utilizing Device in communication with a first Service Port can access another Utilizing Device communicating with different Service Ports via the SPN, without configuring the Utilizing Devices to communicate with the Networking Ports of the Service Points. Utilizing Devices preferably address all Service Points of the network using a single common IP address.

The invention further provides a method for providing access to resources via a secure wireless communication network by providing a self-configuring Service Point Network (SPN) of multiple Service Points. Upon joining the SPN, each Service Point is dynamically assigned an SPN-unique identifier. Utilizing Devices are each connected to one or more Service Points, providing first and second Utilizing Devices access to each other via secure communication through the SPN between the corresponding Service Points connected to the Utilizing Devices, using an asymmetric public-private encryption key pair that is at least partially based on the Service Point unique identifiers. In this aspect, providing first and second Utilizing Devices access to each other through the SPN further includes encrypting communications at the Service Point connected to the first Utilizing Device and further encrypting the key needed to decrypt the communications using a public encryption key of the Service Point connected to the second Utilizing Device. Thus, secure communication proceeds through the SPN between an Entry Service Point connected to the first Utilizing Device and a Terminal Service Point connected to the second Utilizing Device, and is encrypted by the Entry Service Point in such a manner that it can only be decrypted by the Terminal Service Point.

In a further feature of the present invention, the encryption key is employed to send a recipient Service Point one or more management directives in a secure and authenticated manner. The management directive incorporates a "liveness" value public key challenge for purposes of authentication. Management directives used in SPN formation include one or more of the following: hello, welcome, join, accept, leave, or goodbye. In another aspect, the recipient Service Point is associated with multiple encryption key pairs (e.g., Manufacturer, Owner, Operator), and the different encryption keys are utilized corresponding to different classes of management directives.

BRIEF DESCRIPTION OF THE DRAWINGS

Except where expressly noted otherwise, the following Drawings and the accompanying Detailed Description are exemplary in nature and provide illustrative embodiments of the present invention and aspects thereof.

DETAILED DESCRIPTION OF PREFERRED EMBODIMENT

A. The Service Point Network—Overview

We introduce herein the concepts of the Service Point and the Service Point Network. Service Points ("SP") cooperate with one another like building blocks to form a network using a shared wireless communication protocol. The resulting wireless network is referred to herein as a "Service Point Network" or "SPN," and we refer herein to an SP's communication interface with other members of an SPN as the SP's "Networking Port." Each Service Point also provides a (logically) separate interface (a "Service Port") for connection with one or more devices ("Utilizing Devices") utilizing the communication services of the SPN, whether as sender or recipient of information, resources, and/or requests thereof. Utilizing Devices are not part of the SPN, and need not necessarily support or recognize the shared wireless networking protocol(s) of the Networking Ports used for communication among SP's within the SPN; provided that each Utilizing Device does support protocol(s) sufficient for communication with the corresponding Service Port to which it is connected.

Figure 2A:
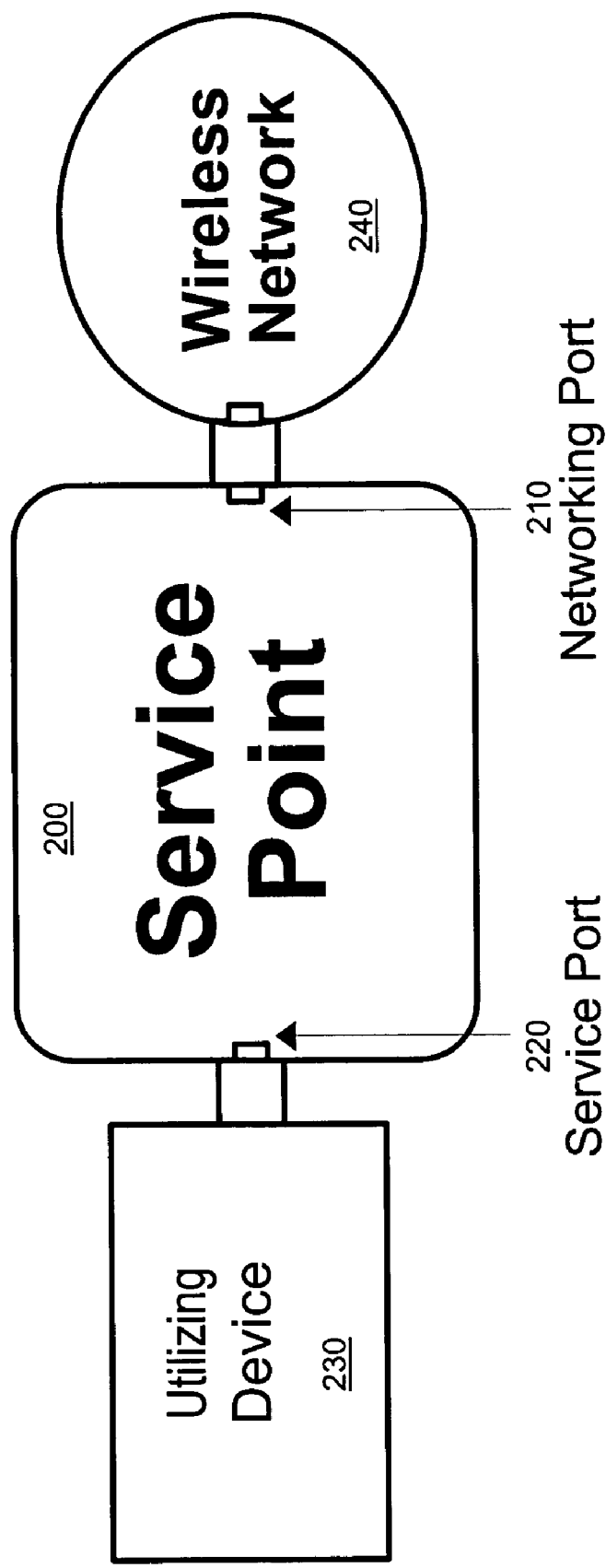
FIG. 2a illustrates a Service Point (SP) device, including Service Port and Networking Port.
Figure 2B:
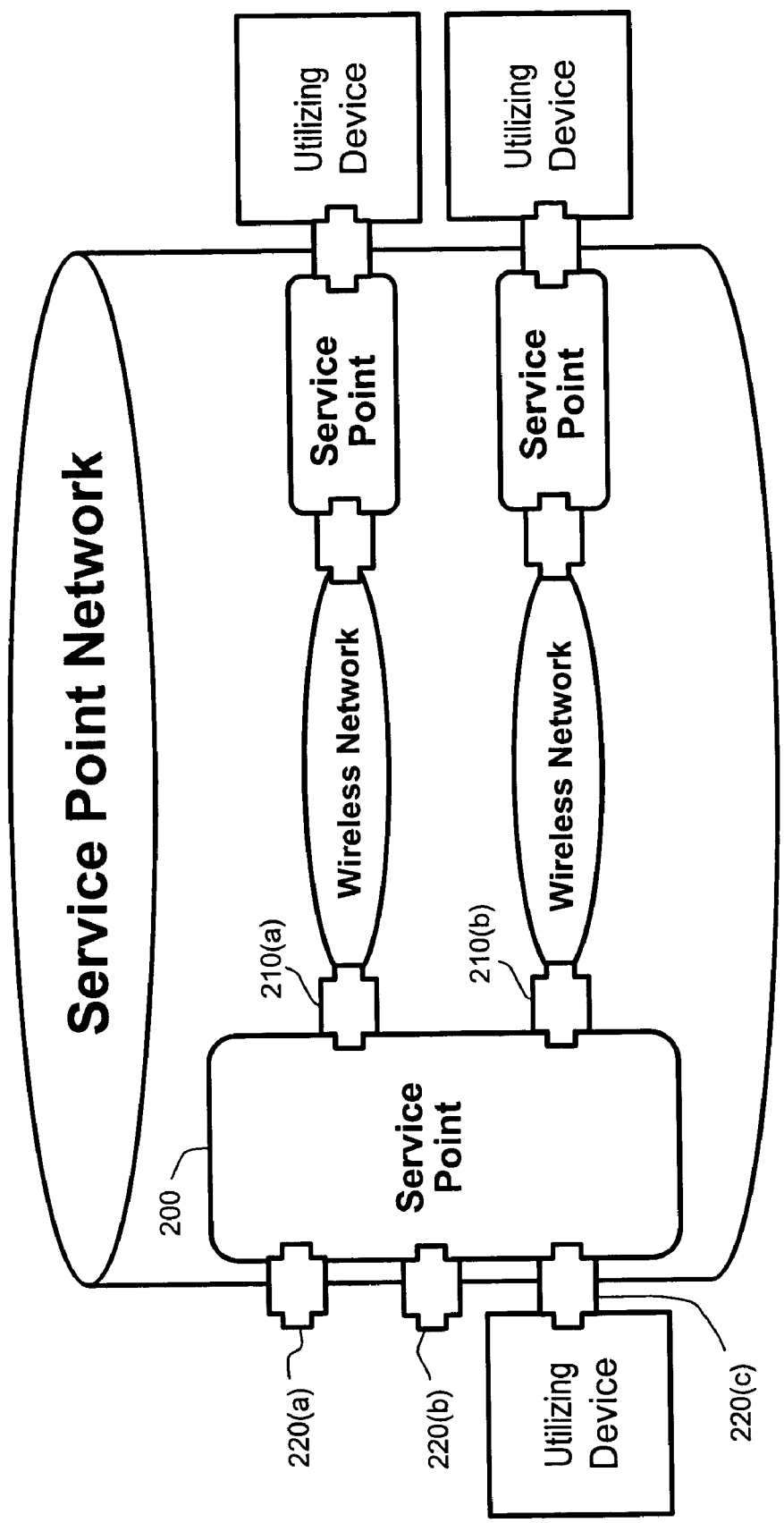
FIG. 2b illustrates an SP with multiple Service Ports and Networking Ports.
Figure 3:
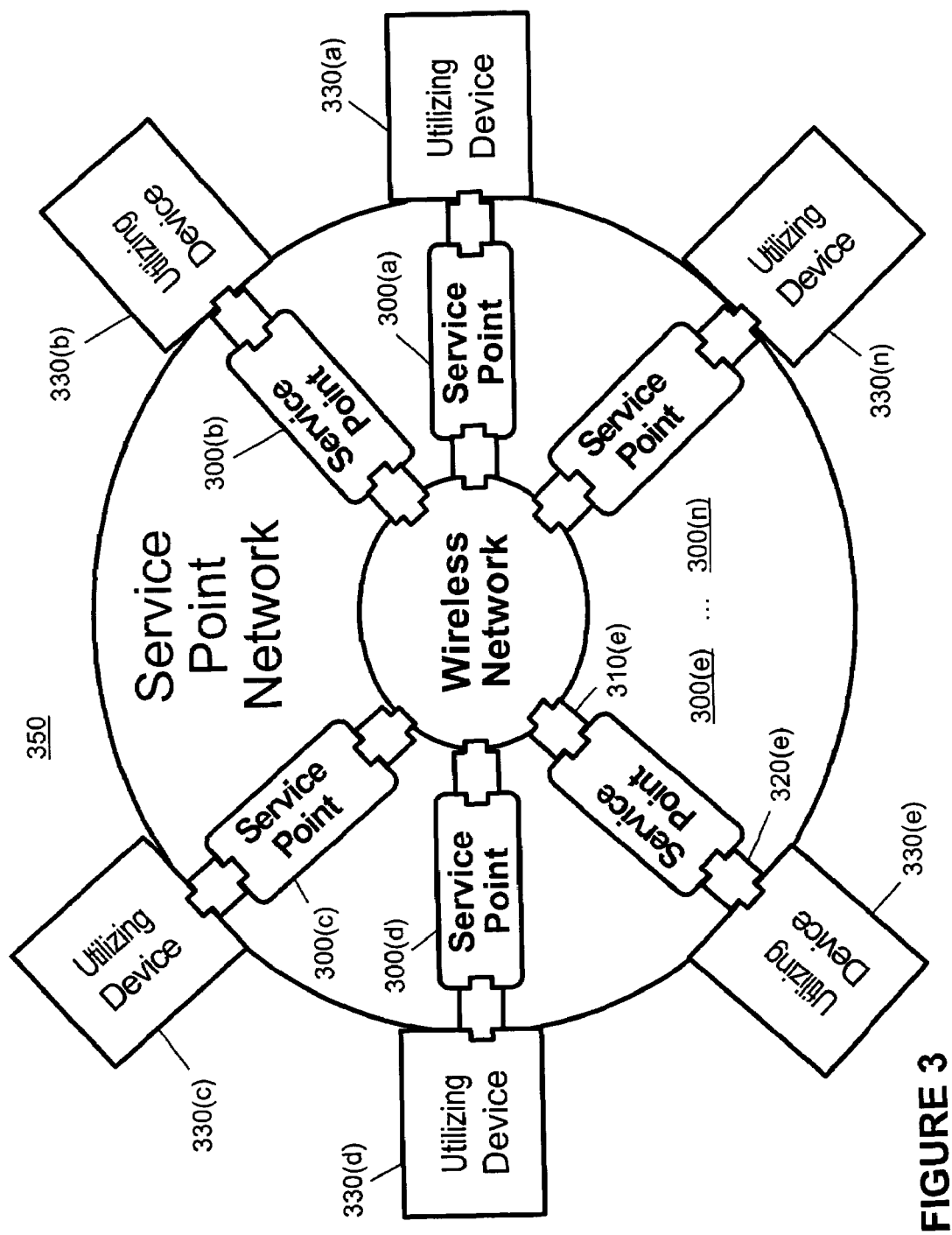
FIG. 3 depicts a plurality of SP's forming a Service Point Network (SPN) via Networking Ports, and connected to a plurality of Utilizing Devices via Service Ports.

FIG. 2a illustrates basic logical features of Service Point 200 in one embodiment, including Networking Port 210 and Service Port 220. SP 200 interfaces with Utilizing Device 230 by means of Service Port 220. Using Networking Port 210, SP 200 can communicate with other SP's to form an SPN, as discussed below in more detail. Thus, FIG. 3 shows a plurality of SP's 300(x) forming SPN 350 via their wireless Networking Ports 310(x), and connected to a plurality of Utilizing Devices 330(x) via their Service Ports 320(x). Connected Utilizing Devices 330(x) are not considered a part of Service Point Network 350, and need not contain any custom software or hardware related to the operations of the SPN Networking Ports. Consequently, the wireless networking technology used by Networking Ports 310(x) to form Service Point Network 350 (e.g., 802.11 DSSS, 3G CDMA, or Ultra-Wideband) can be independent of the technology used for connecting Utilizing Devices to Service Points (e.g. USB, IR, Serial, Ethernet, Parallel). In addition, Service Port 220 may or may not be physically (hardware) distinct from Networking Port 210—provided they perform logically distinct roles, as described. As depicted in FIG. 2b, SP 200 can optionally include multiple Networking Ports, e.g., 210(a) and 210(b), and/or multiple Service Ports, e.g., 220(a) and 220(b).

Figure 1:
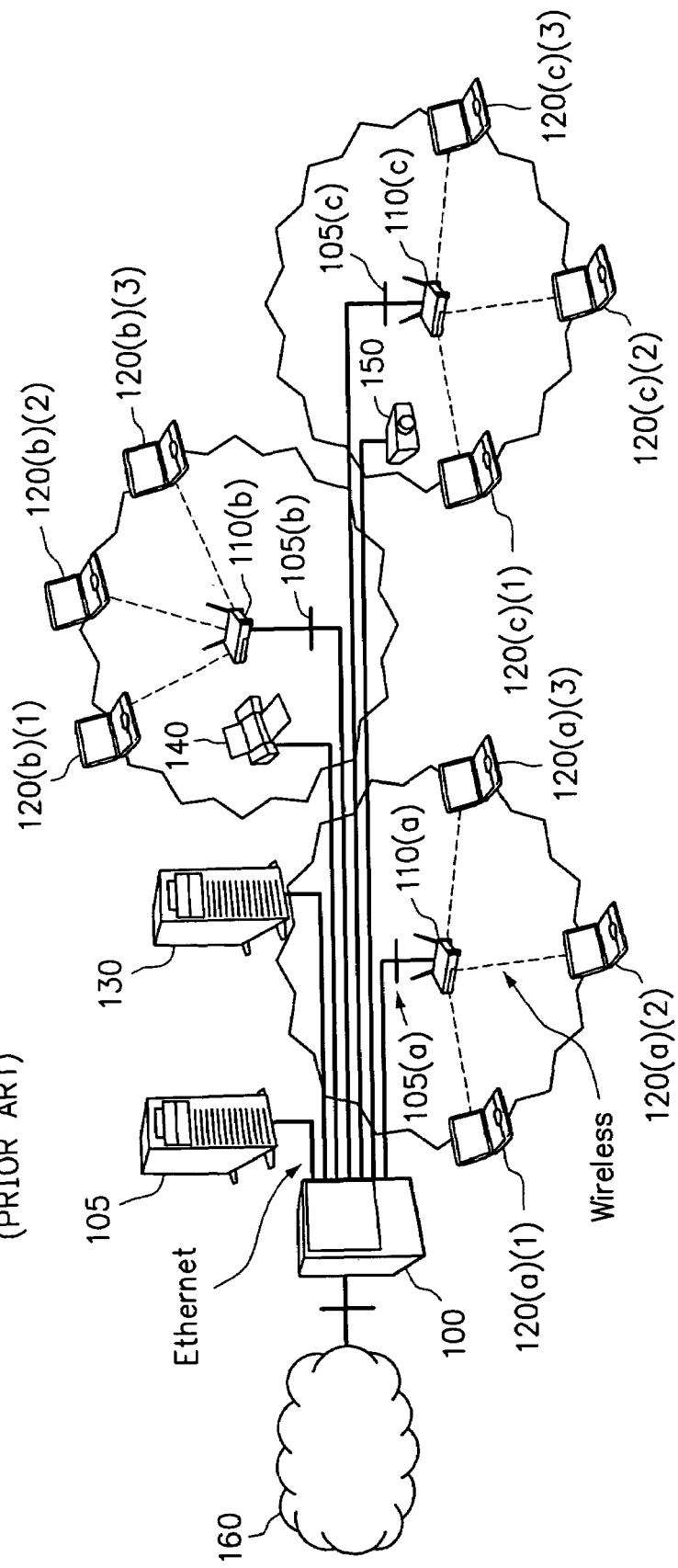
FIG. 1 illustrates a prior art wireless local area network (WLAN).
Figure 4:
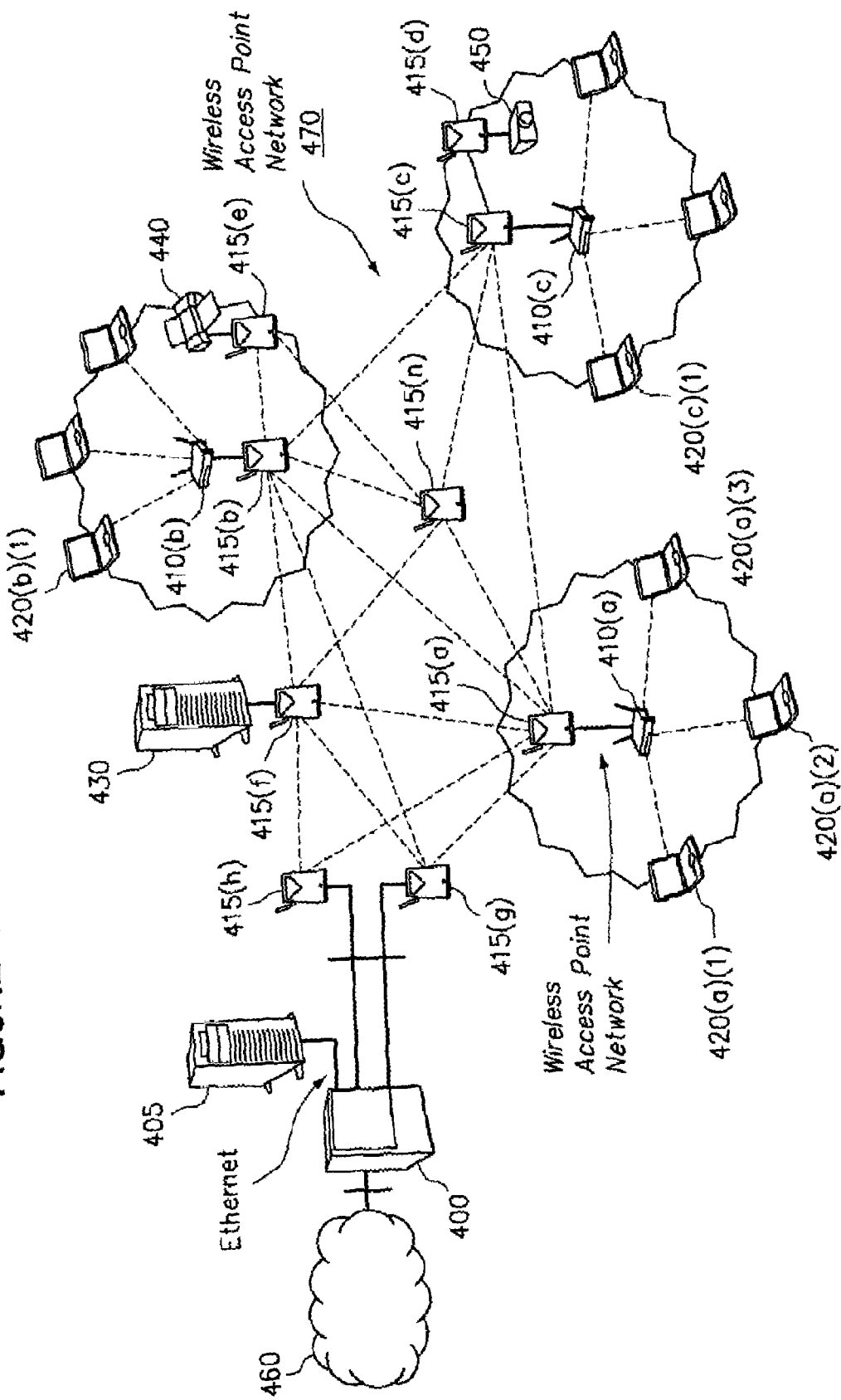
FIG. 4 illustrates a WLAN augmented by an SPN.

FIG. 4 illustrates a WLAN augmented by SPN 470 in accordance with a preferred embodiment of the present invention. In contrast with prior art WLAN shown in FIG. 1, access to WLAN resources can be provided for wireless mobile clients 420(x)(i) without requiring wired connections running from each of AP's 410(x) to LAN server 400. Instead, each of AP's 410(x) is connected locally to a corresponding SP 415(x) of SPN 470. Collectively, Access Points 410(x) connected to Service Points 415(x) form an extensive WLAN network accessible to mobile clients, utilizing SPN 470 as the backhaul. Thus, Service Points differ from (and are complementary to) Access Points, in that an SPN offers a connection to communications and services (including, for example, wireless client access via Access Points) anywhere that is desired, without having to run wires for the communications infrastructure. Using Service Points, network designers can freely locate network services so as to provide true location-dependent services and even systems where the entire network can be mobilized (the latter is discussed below in connection with FIG. 11), without the need for wired connections between the locations where services are accessed and the location where services or resources are originated.

An SPN is preferably, but not necessarily, self-configured by the SP's as an ad hoc mesh network. "Ad hoc" is used here in the broad spirit of: (1) formed or used for specific or immediate problems or needs, and/or (2) fashioned from whatever is immediately available. The ad-hoc character of an SPN is preferably with respect to at least one or more of the following: network membership, time, location, and environment (the latter including, for example, line-of-sight, low humidity, elevation, metallic vs. non-metallic partitions, indoors, outdoors). In other words, preferably the SP's collaborate opportunistically with any available SP's in radio contact (and meeting threshold criteria, such as the authentication and privacy criteria discussed below) to form an SPN, with the premise that each of the member SP's may independently leave over time and that new member SP's may independently join over time. In addition, the SPN's topology is preferably a "mesh", meaning that there are multiple alternative paths through the network between at least some pairs of member SP's. Mesh topology is considered preferable due to the relatively high number of connected systems made possible by omni-directional radio transmissions: LAN segments are segregated by wiring and network design, whereas WLAN segments tend to have more indeterminate integration with other WLAN devices due to the broadcast characteristic of their medium. In a preferred embodiment, SP Networking Ports are implemented using IEEE 802.11 compliant wireless broadband radios operating in "Ad-Hoc Mode" to build a self-configuring SPN. The SPN is preferably an IP network supporting multi-hop point-to-point and multi-cast routing, as will be discussed at greater length below.

In the following sections the preferred activities and capabilities of the SPN are described in further detail. These activities are generally carried out by independent and/or cooperative actions of Service Points. Optionally, additional management elements may be employed for observing these activities or for modifying Service Point attributes, as discussed below in Section F ("Service Point Management").

B. Service Point Initialization

Service Point initialization involves all the processes necessary to put a Service Point into a specified state (e.g., Active, Standby, Shutdown, Maintenance). The initialization is designed to be automated and to provide plug & go usage. The following Table 1 illustrates the processes a Service Point sequences through to initialize itself into the Active State.

TABLE 1

Initialization Sequences

| Process | Activity |
|---|---|
| Self-test | Power on sequencing of self checks and interface capabilities (e.g., LAN connection, radio channels, radio modulation schemes, memory, software services) |
| Scanning | 10 Sec Silent Scan per Ch for Activity |
| SPN Formation | Select Ch, SPN, and ID for formation, Activate Hello messaging and attempt mesh formation based upon selections |
| Activating | Successfully formed, now actively participating in a SPN |

The progression of a Service Point through these processes is meant to be independent of, and cooperative with, the chosen routing protocol (e.g., TBRPF) and the specific communications technologies (e.g., 802.11 MAC). The initialization activities may also include security initialization processes, such as those of well established network security standards (e.g., 802.1x Security).

At the moment two or more Service Points have formed a nascent SPN, any devices attached to these Service Points potentially expect to be able to begin IP communications immediately. Therefore, some networking fundamentals (e.g., DHCP, SNMP, SMTP, DNS) and their associated Servers are preferably supported by the SPN even at that early stage in order to support the flow of IP traffic, such as by configuring each Service Point to provide limited forms of these services as required in a distributed fashion.

Figure 5:
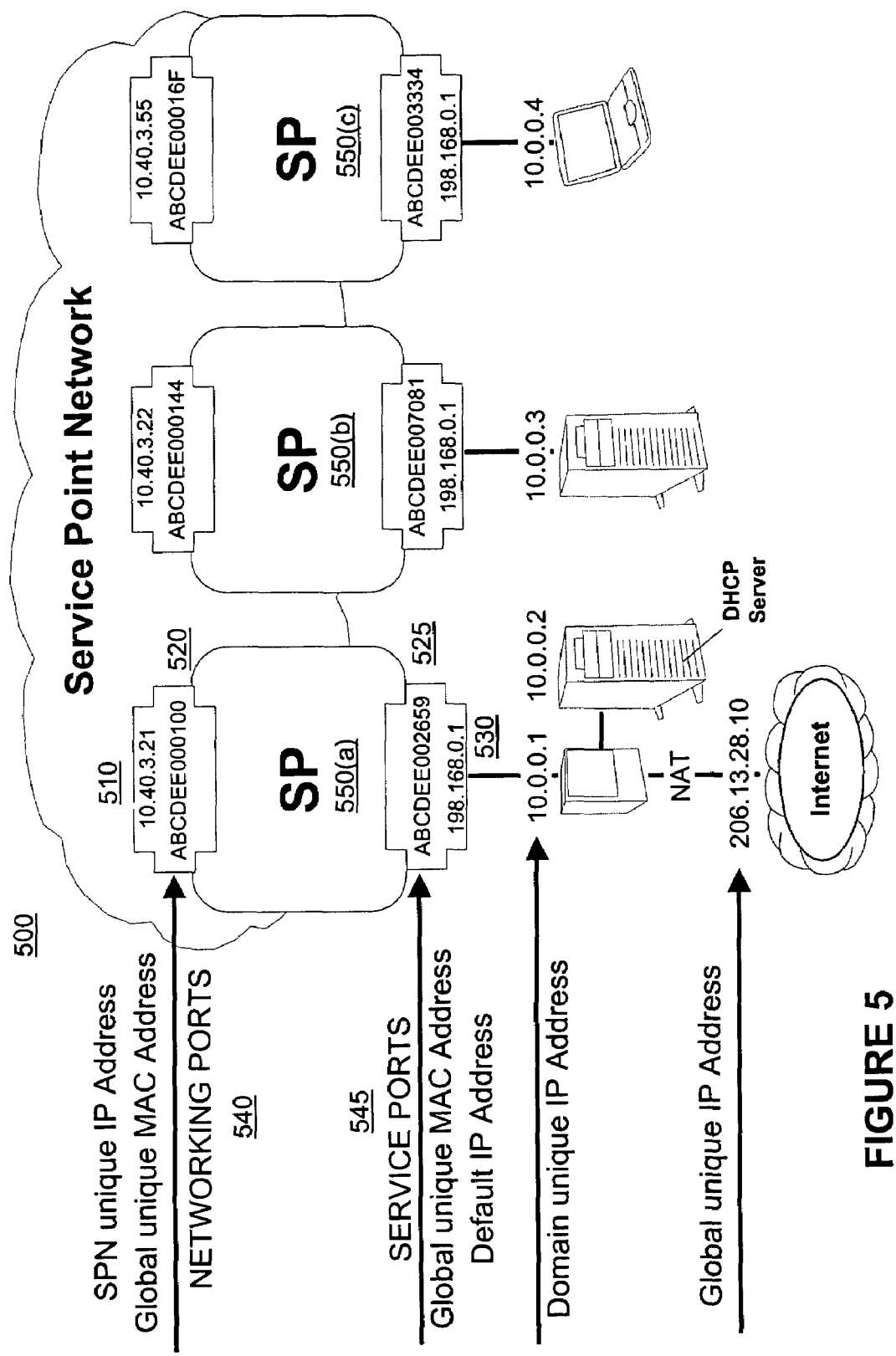
FIG. 5 diagrams network address and port identification for SP's.

In a preferred embodiment, public key cryptographic mechanisms are employed to help safeguard the security and integrity of the Service Points. The keys allow secure encryption of all traffic within the SPN, as will be described in the next section. Each Service Point preferably carries a unique, manufacturer-installed digital identifier that can be used to uniquely authenticate each Service Point and its resident software. During formation, an SP is challenged and not accepted into the SPN if it lacks the requisite digital identifier. This authentication capability can similarly be employed in the course of various Service Point activities; for example, authentication can be tested and required in connection with management functions such as in-field product software upgrades. In addition, during the SPN formation process, unique names and addresses are preferably assigned to each SP 550 in the network, as shown in FIG. 5. Thus, each Service Port 545 within a Service Point 550 is given a globally unique port identifier 525 which is the result of a function of (hardware identifier(s), time-of-day, network identifiers, and port number). Although this function is applied during initial startup of Service Points it may be rerun as needed during the operational stage of the Service Point. Port ID 525, in turn, is used to generate a public/private encryption key pair, for encrypted communication as described in the next section. Networking Port 540 (e.g., 802.11 radio) for each SP 550 is also given an internal IP address 510, unique to SPN 500 and utilized for addressing and routing of traffic within the SPN, as will also be described in the next section.

C. IP Transport—from Originator to Destination, Through the SPN

Figure 6A:
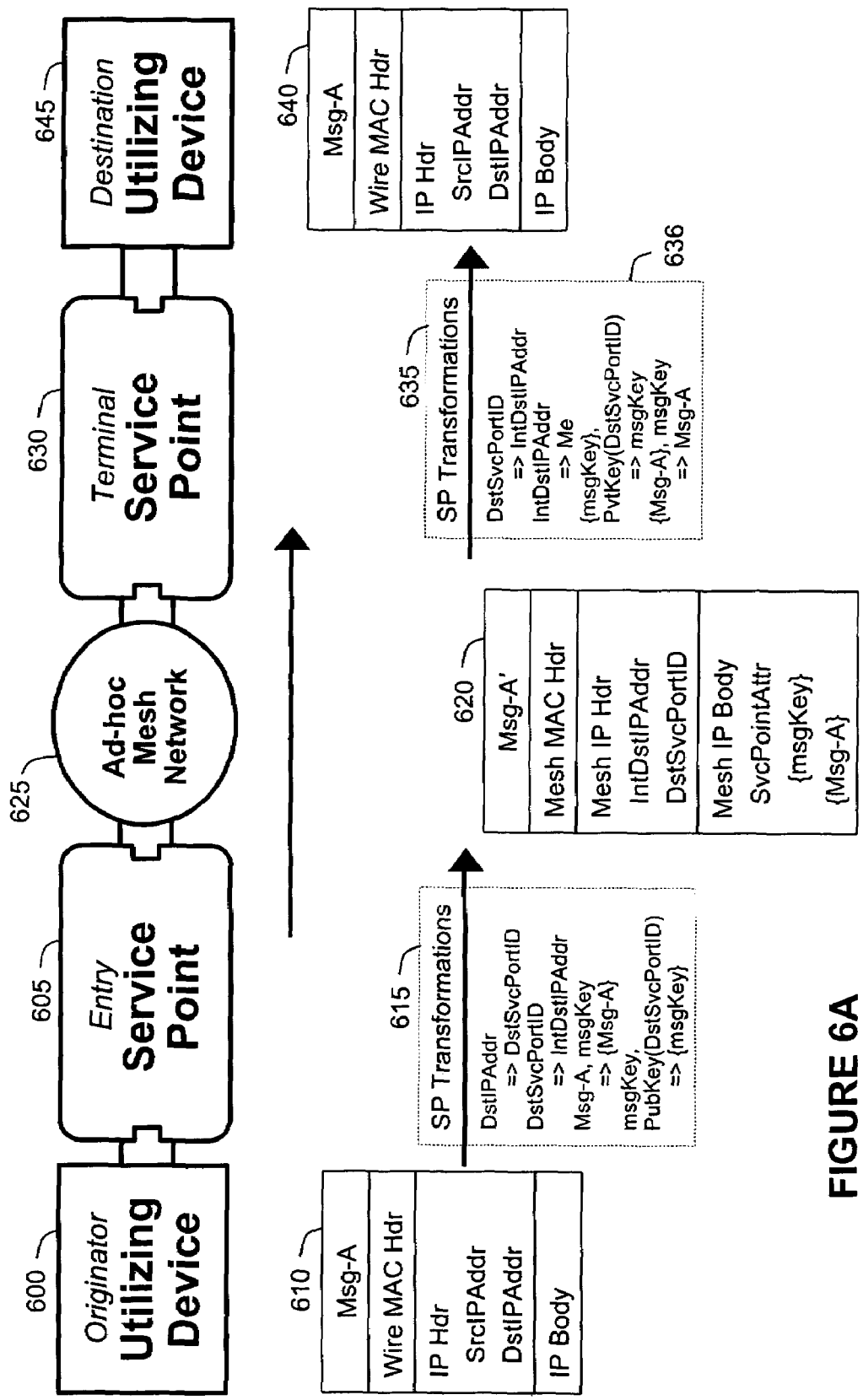
FIG. 6a diagrams a secure communication process via an SPN.
Figure 6B:
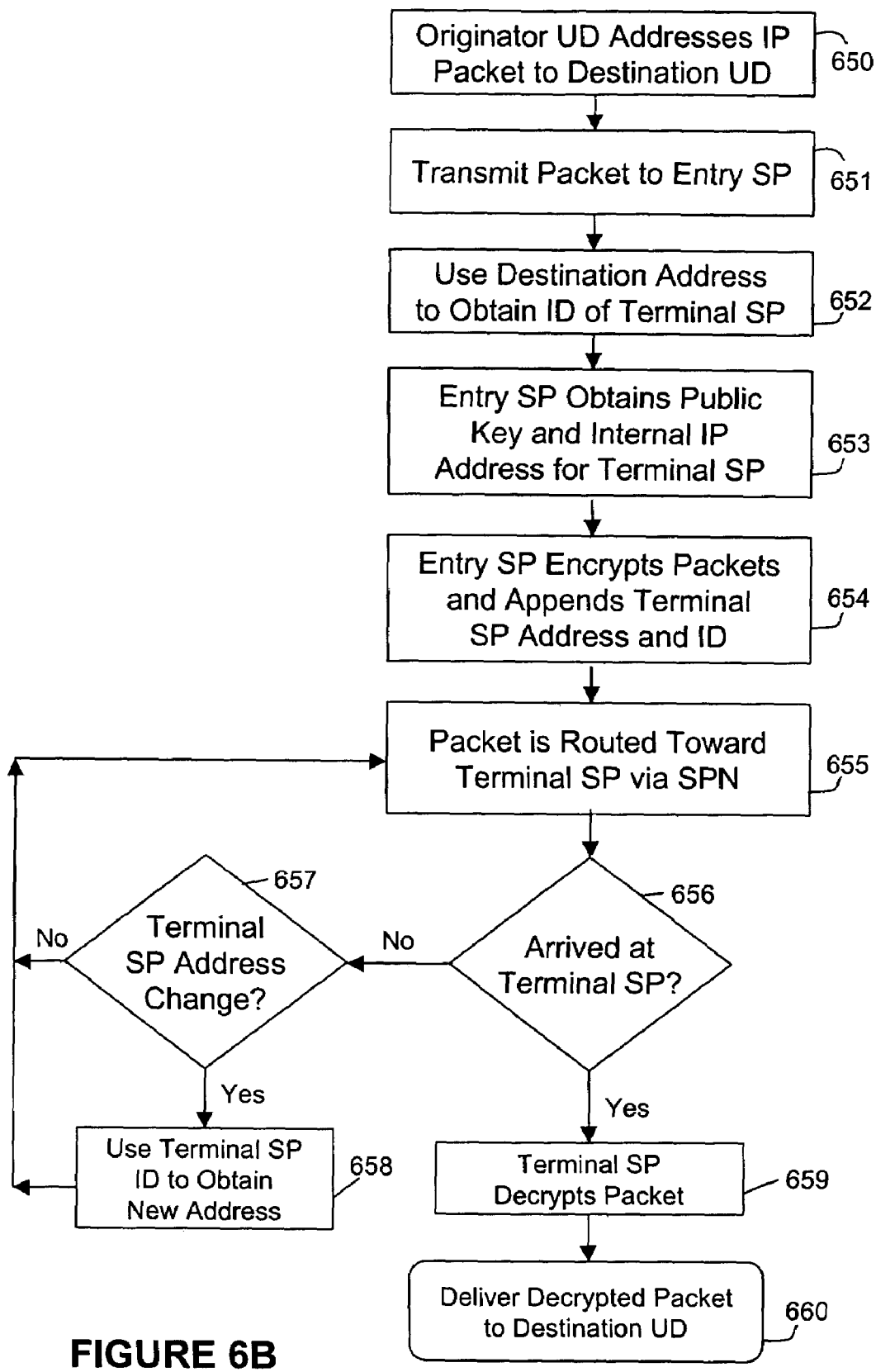
FIG. 6b is a flow diagram for a secure communication process via an SPN.

The process by which Utilizing Devices can communicate and access each other via a Service Point Network, in accordance with a preferred embodiment of the present invention, will now be described with reference to FIG. 6*a* and the flow diagram of FIG. 6*b*. For convenience we occasionally call the Utilizing Device originating a communication the "Originator", while we call the Utilizing Device that is the intended recipient of a communication the "Destination"; and we occasionally call the Service Point connected to the Originator the "Entry" Service Point, while we call the Service Point connected to the Destination the "Terminal" Service Point.

At 650, Originator Utilizing Device 600 preferably complies with standard IP network addressing requirements and addresses a communication packet 610 to be sent with the destination IP address of the Destination Utilizing Device, the ultimate intended recipient of that packet. At 651, IP packet 610 is delivered from Utilizing Device 600 to its connected Service Point 605, the Entry SP. Entry SP 605 performs a series of transformations 615 as follows. At 652, the destination address of packet 610 (which is the IP address of the Destination) is used by the Entry SP to retrieve the Port ID of the Terminal SP, i.e. the SP connected to the Destination Utilizing Device. In order to support this indexed retrieval, mappings are preferably maintained, in internal tables, between each Port ID and the IP address of any Utilizing Devices connected to the SP assigned that Port ID. The Terminal SP's Port ID is in turn used by the Entry SP, at 653, to retrieve from tables the associated public cryptographic key for that port and the internal IP address of the Terminal SP. Practitioners will readily recognize many equivalent ways to structure and implement such tables, effectively representing the logical relationships described.

Those tables are preferably stored locally or otherwise available to each SP. Thus, by examining the Destination IP address provided by the Originator for a particular message packet, and then performing straightforward table lookup, the Entry Service Point can determine the Port ID, internal IP address, and public key of the Terminal SP port to whom the packet should be delivered. In some cases—e.g., for broadcast packets—the steps of the method may be carried out for more than one Destination Utilizing Device and correspondingly for more than one Terminal SP Port ID, encryption key, and/or internal IP address.

At 654, the Entry SP 605 encrypts the original message packet 610 using the Terminal SP's public key, and a new IP header is attached to this encrypted data 620. This new IP header preferably contains the Entry SP's internal IP address, Entry SP Port ID, Terminal SP's internal IP address, and Terminal SP's Port ID. As practitioners will appreciate, this process is akin to IPSEC tunneling, but is preferably stateless.

The packet 620 is routed at 655-656, in a multi-hop manner through the Ad-hoc Mesh Network 625 toward the Terminal SP 630 (preferably in accordance with the routing algorithm and protocol described below in Section E). When packet 620 eventually arrives at Terminal SP 630, at 659-660 the Terminal SP will perform several transformations 635 to restore the original packet. In one of these transformations 636 the packet 620 is decrypted by Terminal SP 630 using its private key, and the fully transformed packet 640 (identical to original Packet 610) is delivered to Destination Utilizing Device 645 via the Service Port of the Terminal SP. However, while in multi-hop transit across the SPN from Entry SP 605 to Terminal SP 630, the packet 620 may encounter reassignment of the Terminal SP's internal IP address, or newly formed IP subnets within the Ad-hoc mesh network (subnets are discussed below in Section D). This occurs because SPNs form dynamically, and by nature are subject to changes in connectivity and membership. For this reason an SPN will typically need to reissue updated internal IP addresses to Service Points from time to time. In a preferred embodiment, Port ID numbers and the associated PKI encryption keys for each SP remain constant, whereas the internal IP addresses for each SP may change to reflect changes in network formation. Nevertheless, mapping of the current internal IP address to each Port ID number is maintained dynamically in tables distributed in each SP, as indicated above at 652-653. Therefore, each Service Point is capable of using the Terminal Port ID at 657-658 to make any transformations necessary to find the new IP address of the Terminal SP and to continue the packet along its way, for example by using a mechanism such as Internet Port Address Translation (PAT). In this way, changes to the internal IP address of a SP from time to time have no effect on the directory of devices and networks attached to the SP's (indexed by constant Port ID's, as noted above) or their connections to each other.

At 659, as previously noted, the packet is decrypted at the Terminal Service Point, and in fact can only be decrypted by the Terminal SP because that is the only device in possession of the corresponding private key, in the preferred embodiment. Thus, user data moving in the body of IP messages within the SPN is preferably encrypted edge-to-edge—i.e., from the Service Port of the Entry SP that is connected to the Originator Utilizing Device, to the Service Port of the Terminal SP connected to the Destination Utilizing Device. Consequently, SPNs themselves do not increase the exposure of user data per se. However, practitioners should bear in mind that beyond the SPN—for example, the wireless transmission of data between a mobile client and an Access Point connected to a SP as a Utilizing Device—this information enjoys no special protection by the SPN, and user information that must be protected should be protected using standard virtual private networking utilities of the appropriate strength.

In some cases and embodiments, determination of the Terminal SP by the Entry SP may advantageously be driven in part by location-sensitive considerations. For example, the needs of a Utilizing Device (such as a client computer user) seeking access to the printer located nearest to that Utilizing Device might be best served by routing the communication to the Terminal SP that is connected to the "nearest" printer as determined by the SPN topology map maintained throughout the network in each SP. This approach uses network topology as a proxy measure for physical proximity. Alternatively, if current physical locations of each SP in the SPN are known and maintained in a table or other storage available to the SP's, then in the previous example the Entry SP can inspect the location table and identify which one of the SP's that is connected to a printer is located physically closest to the Entry SP itself.

In the preferred embodiment, there is no need for the Originator or the other Utilizing Devices to know or specify internal IP address 510 or Port ID 520 for the Terminal SP or any of the other SP's. Instead, the SPN is preferably an IP network operating within its own domain. Devices connecting to a Service Point see the SPN as a virtual switch with a single IP address for management. Within the SPN Service Points are assigned internal (hidden) IP addresses. These SPN IP addresses are not accessible from outside the SPN. Management applications (as discussed below in Section F) can obtain an identifier for each Service Point by contacting SPN management handler (SNMP) 942 within any Service Point (see FIG. 9, discussed below), and the handler will translate requests as necessary so they are internally routed within the SPN to the desired Service Point.

D. Subnets; Private SPNs

SPN formation and internal IP addressing preferably takes full advantage of subnets and subnet routing as is done in the Internet today, in order to optimize routing and network management considerations. For example, when a new SP acts to join a public SPN, if multiple public SPNs or subnets are available within radio contact, one possible strategy is for the SP to join the smallest such SPN or subnet. (Different considerations and constraints apply with respect to Private SPNs, discussed below.) Moreover, as an SPN grows in size and complexity it may partition itself into subnets as necessary to optimize routing and security management. Similarly, smaller SPNs may be merged in an attempt to optimize routing and security management. Several attributes are preferably considered in these partitioning and merging functions (e.g., Frequency, Authentication, Density, Identification, Age, Technologies). Consider the use of frequency as a metric for partitioning an active SPN. By monitoring the population of SP's currently in the SPN and understanding their connectivity with one another, a certain threshold for density can be exceeded. With this event a scan can be conducted to see if another frequency is available with a lower density figure or even unoccupied. Once identified, this "goto" frequency is advertised and SP's can make the decision to drop out of the current SPN frequency assignment and goto the advertised frequency. Even if more than one goto frequency is selected, it is okay for different SP's to move to different frequencies. In a like fashion, a too-low density threshold can be detected after an aging function and a decision can be made to try to move to a more highly connected SPN.

Figure 7:
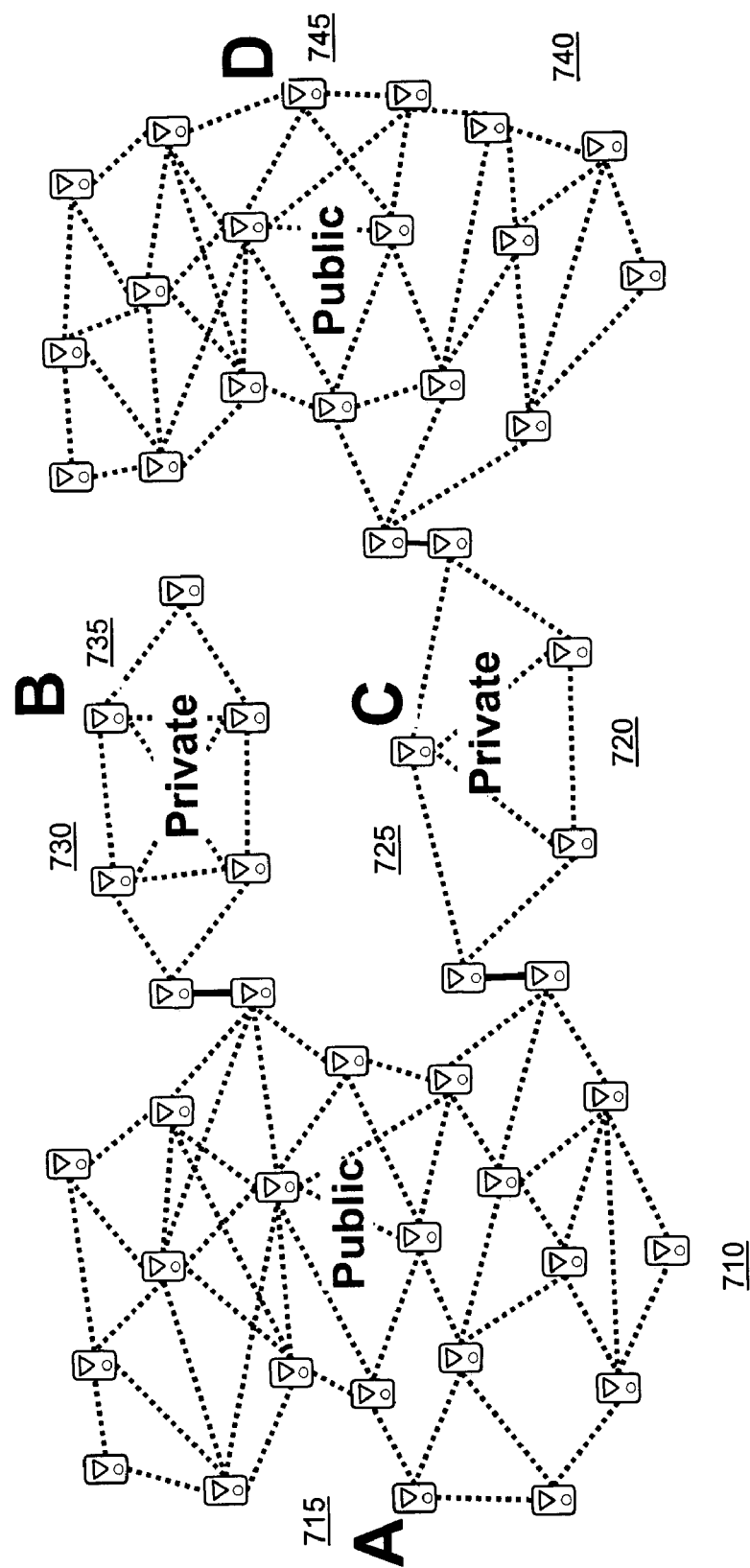
FIG. 7 illustrates an SPN comprising public and private sub-nets.

An SPN is preferably formed according to one of two construction principles, Public or Private. These constructs are from the perspective of the routing and forwarding functions. Service Points within a Public SPN willingly forward any traffic to and from destinations within or beyond the Public SPN. In contrast, Private Service Points within a Private SPN will only forward traffic to or from destinations within the Private SPN. This restricts Private SPNs from being used as transport bridges for Public SPNs. These restrictions only apply to the routing of messages and are not a characteristic of nodes connected to the Service Point. FIG. 7 illustrates the contrasting effect of these two constructs. Node A 715 of public SPN 710 cannot traverse either of the Private SPNs 720 or 730 in order to talk to Node D 745. Node A 715 can talk to Nodes B 735 or C 725, however, as those nodes are endpoints within their respective Private SPNs 730 and 720.

Public construction allows Service Points to be added to a Public SPN by anyone. Hence, large communities can create an SPN rather dynamically as each new Service Point is openly accepted into the Service Point Network. In contrast, Private construction preferably requires authentication and authorization for each Service Point to be added to a Private SPN. A customer-specific digital certificate is deposited into each Service Point within a Private SPN as it is accepted into a Private SPN. Thereafter, the customer/owner has the ability to perform optional management functions on Service Points using SPN management software as discussed in Section F below.

E. SPN Routing Algorithm

In wireless multi-hop networks generally, a routing algorithm is needed to consider several link attributes while trying to deliver a desired Quality-of-Service. In an ad-hoc mesh SPN, the routing algorithm faces the especially dynamic nature of link attributes resulting from changes in traffic load and radio connectivity. As practitioners will recognize, choosing the routing algorithm for a given application or embodiment should be done with an eye toward preserving the stability of the SPN. For a preferred embodiment, the inventors have selected the mobile routing algorithm known as "TBRPF" (Topology Broadcast based on Reverse-Path Forwarding), developed by SRI International (see International Patent Application No. PCT/US01/69863, "Mobile Ad Hoc Extensions For the Internet," filed Mar. 16, 2001 by SRI International). TBRPF algorithm is a relatively mature routing algorithm, is distinguished by its low overhead, and supports multi-hop routing in both partial and full mesh topologies.

The routing algorithm is an important core element of an operational SPN. Nevertheless, there are also several other critical functions needed to support the SPN such as Management, Billing, Performance Tuning. In the management area alone there are such things as power control monitoring and adjustment, spectrum monitoring and selection, and queue monitoring and prioritization. Additionally, the routing algorithm as well as these other key operational components have been modularized making their replacement and switchover possible within operational Service Points.

TBRPF has been submitted to the IETF for consideration in the Mobile Ad-hoc Network (MANET) working group as a proactive category candidate (see http ://www.erg.sri.com/projects/tbrpf/docs/draft07.txt, Mobile Ad-Hoc Networks Working Group Internet-Draft, "*Topology Dissemination Based on Reverse-Path Forwarding (TBRPF),*" SRI International, dated Mar. 3, 2003). Mesh networks present a number of technical challenges (e.g., hidden and blocked terminals, channel capture, overhead traffic, and propagation delays) and TBRPF is a mature and well-tested protocol that helps overcome such challenges in a scalable fashion.

In order for the SPN to efficiently route traffic (anything less than flooding) from Entry SP 605 to a Terminal SP 630, it fundamentally needs to know that the destination exists and how to get to it. Some routing algorithms operate on demand by getting the answer to these questions when they are needed. Others are more proactive working to cache and maintain this information throughout the SPN so that it will be available when needed. These two approaches have differing management overhead profiles and thus their performance can vary greatly in different environments. TBRPF is a proactive algorithm, and simulation and evaluation indicates that it maintains a relatively conservative management overhead profile.

Within a distributed routing algorithm the question of a destination's existence and how to get to it may be generalized. For example, in some nodes the answer may be, "I don't know if the destination exists, but if it does it would be in that direction." Similarly, the complete path to a destination may not be known in a given node but the answer may be, "I don't know the full path to this destination, but I am on the path and I should forward this message along." It is generalizations such as these that allow the management of distributed algorithms to be conservative on sending out costly routing information. It also illustrates how an algorithm might take advantage of combining both proactive and on demand characteristics.

Just knowing that a node is on the path to the destination is still not quite enough to launch a radio transmission. There are also the questions such as, "Who is next on the path?" "When should I send?" "What power should I transmit at?" Once again routing algorithms will differ on how they address these questions. The who 's next question can either be asked by the sender or the receiver. With unicast transmissions the sending node decides which is the next node towards the destination. With multi-cast transmissions the receiving nodes must decide independently which of them should be the next node towards the destination. There are pros and cons to each of these approaches. In a preferred embodiment, we use TBRPF and allow Service Points to select to use either unicast or multicast methods.

Even the seemingly simple when to transmit question is compounded by the effects of the hardware's MAC, radio interference, message backlog, Quality of Service, signal strength, and mobility. Thus, it will by now be apparent to the practitioner that the forwarding algorithm is very complex, distributed, and dynamic. While our preferred embodiment utilizes TBRPF, as discussed, it should be emphasized that Service Point Network architecture in accordance with the present invention permits the use of any routing algorithm as selected by the practitioner.

Further, in a preferred embodiment of the present invention, mature standard Internet Messaging Protocols are employed to provide Security and Quality-of-Service options.

F. Service Point Management

Figure 8:
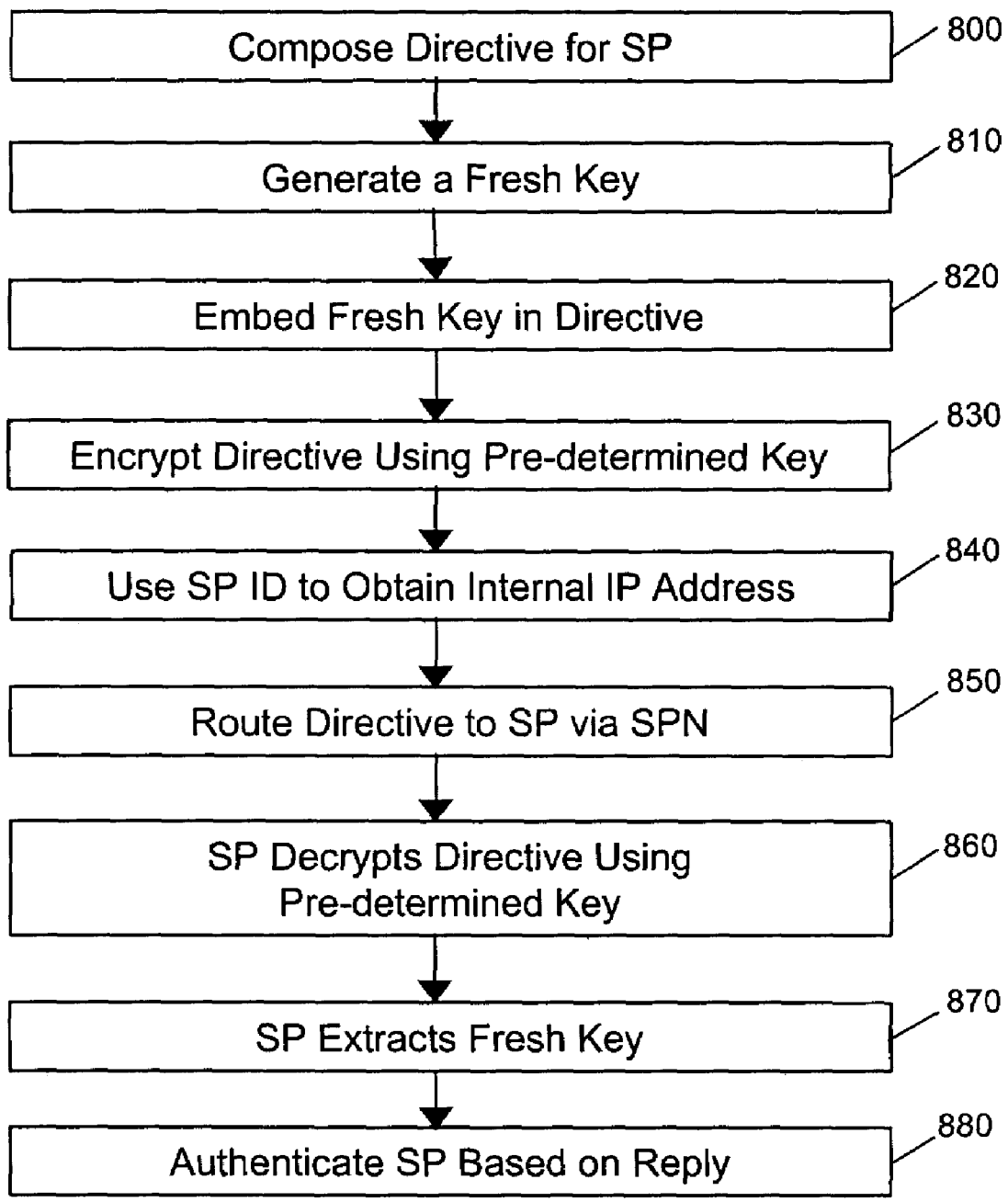
FIG. 8 is a flow diagram outlining a secure process for sending authenticated management directives to SP's.

In a further feature of the present invention, an SP's encryption key is employed to send management directives to the SP in a secure and authenticated manner, as shown in the flow diagram of FIG. 8. Management directives are special communication messages that effect network formation and/or SP configuration, such as: hello, welcome, join, accept, leave or goodbye. It is important to authenticate the identity of the SP's with whom such messages are exchanged, in order to protect the integrity of the SPN from being damaged such as by spurious devices joining the SPN or falsely asserting that a genuine SP is leaving the SPN.

Toward that end, at 800 a management directive is composed for a selected SP. At 810-820, the sender preferably augments the directive message by embedding in it a fresh key (or "nonce" value), as a protection against "replay" attack by unauthorized eavesdroppers. For background regarding the utilization of embedded nonce values as an authentication mechanism to defeat replay attacks, practitioners may reference *Intrusion-Tolerant Group Management in Enclaves*, by B. Dutertre and H. Saïdi and V. Stavridou, from International Conference on Dependable Systems and Networks, Göteborg, Sweden (July, 2001). The augmented message is then encrypted by the sender at 830 using the public key of the recipient SP. In some embodiments, practitioners may find it preferable to associate each SP with multiple encryption key pairs (e.g., associated with manufacturer, owner, and owner of the SPN, respectively) corresponding to different classes of management directives or other authenticated communication, and to utilize each of the different encryption keys depending on the specific communication being sent.

At 840, an ID of the recipient SP is used to obtain the SP's internal IP address. Typically, the original sender of the directive is a member SP of the network, and sender SP preferably performs 840 directly referencing internal tables as discussed earlier in connection with FIG. 6; whereas if the original sender is external to the SPN (e.g. a centralized management entity) then it may indirectly cause 840 to be carried out, such as via contacting an SNMP handler of a member SP as described above at the end of Section C. In any case, at 850 the directive message is ultimately routed via the SPN to the recipient SP, and at 860 the recipient SP decrypts the message using its appropriate private key. Unintended recipients of the message (such as unauthorized eavesdropper) will not be able to decrypt the message, since they will lack the requisite private key. Having decrypted the message, at 870 the genuine recipient SP is able to extract the embedded fresh key, and utilizes that key to generate a response (e.g., encrypted with the extracted key) that can be authenticated by the sender at 880. If the recipient has failed to properly decrypt the message and extract the embedded key, the recipient will fail to respond properly, will fail the authentication test, and consequently its spurious request e.g. to join or leave the SPN can properly be rejected. The embedded key's "freshness" or "liveness" insures that this protocol cannot be deceived by simple replay attack, as illustrated in the above-referenced publication *Intrusion-Tolerant Group Management* in Enclaves within the context of "enclave" groups and virtual private networks.

Although Service Points are designed to auto configure and self heal in the face of changing radio connectivity, there can arise the need to inspect a Service Point for configuration, logs, or diagnostic information. For this purpose a Service Point Management Handler (SNMP 942, see FIG. 9 below) is preferably employed to make these administration tasks simple and SNMP compatible. The Service Point Network management protocol is distributed and does not require a central management service. However, a central management service can optionally be used to either view or manipulate various Service Point operating parameters. For example, a view-only manager can optionally be provided to allow general viewing (but not modification) of performance and wellbeing operating parameters within SP's. This information may preferably be correlated across multiple SP's as well, in order to provide a more comprehensive understanding of how the SP's view the SPN at any given time. In light of the architecture described herein, network information of this nature can be viewed without compromising the security or privacy of SPN traffic. A more aggressive management application can also optionally be provided, allowing authenticated network operators to manipulate parameters within SP's so as to cause them to alter their behavior and independent decision logic. For example, using network management utilities, specific Service Ports can be locked in to receive certain classes of traffic so that all such traffic would be sent to a specified Service Port without regard to other considerations for choosing the destination Service Port. Another example of the Manager Point Application would be to provide an accounting application with access to billing information that it has activated within the SP's.

G. Further Embodiments and Applications

Figure 9:
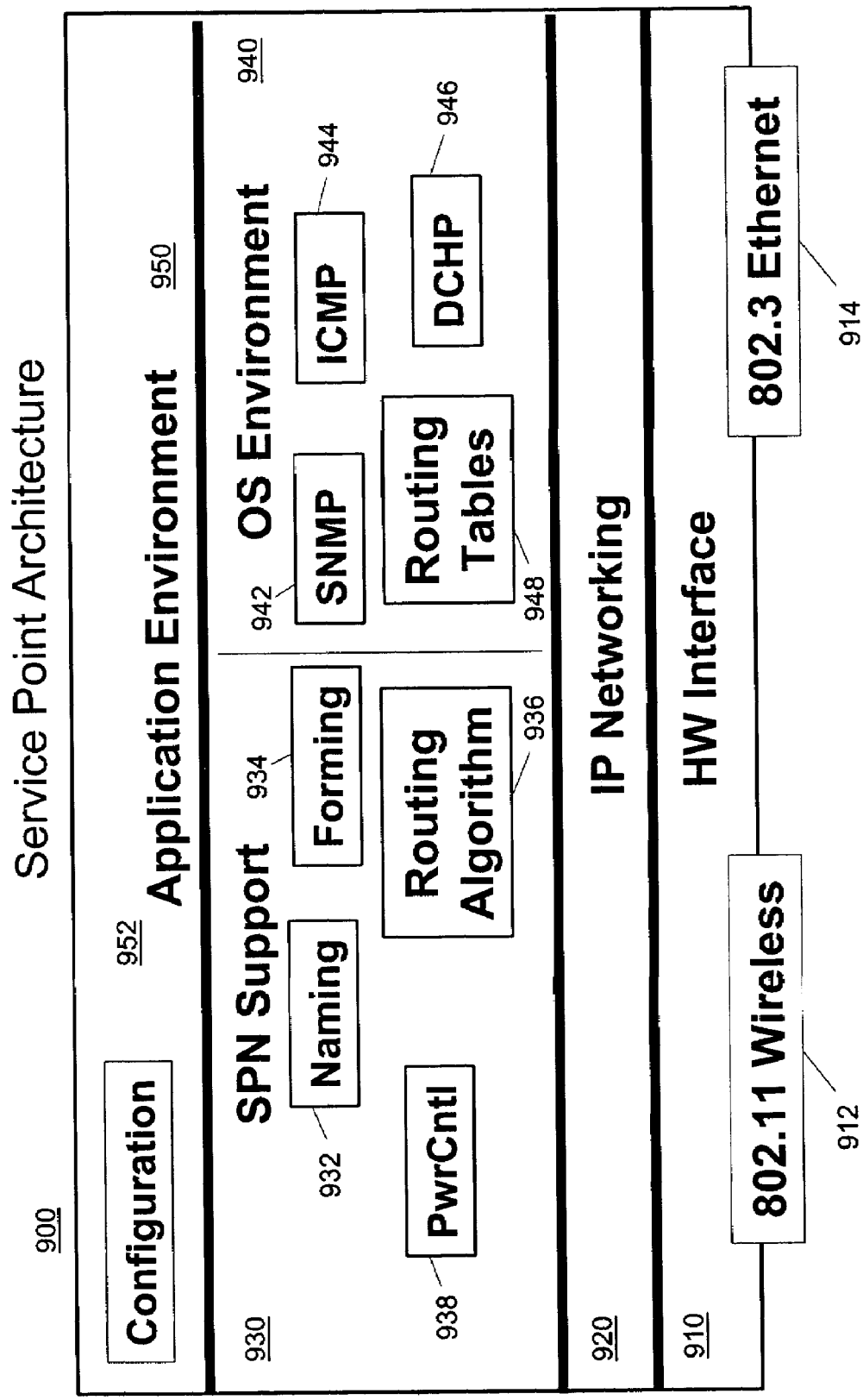
FIG. 9 diagrams the internal architecture for an SP.

FIG. 9 diagrams the internal architecture for an SP 900, in a preferred embodiment. Thus, SP 900 includes hardware interface 910, which in turn includes wireless interface 912 (e.g. based on 802.11 standards) for use by Networking Port 210 of the SP, and wired Ethernet interface 914 for use by Service Port 220 of the SP. SP 900 further includes standard IP networking stack 920, and standard operating system computing environment 940, involving inter alia support for networking protocols SNMP 942, ICMP 944, DCHP 946, and routing tables 948. In addition, SP 900 core environment 930, supporting the functionality of the present invention and including: mesh routing algorithm 936 (as described at length in Section E) for wireless multi-hop routing within the SPN, and SPN support functions such as Naming 932 and Forming 934 configured to perform the ID and address assignment and mapping functions described herein in connection with FIGS. 5-8.

In a further feature of the present invention, PwrCntl module 938 provides logic for dynamic adjustment of low-layer (e.g., physical or Media Access Control) network control parameters such as transmission power and frequency, in response to higher layer (link/routing) network conditions such as connectivity and topology. Each SP, as a member of the SPN, implements a lower layer (e.g., a physical communication layer and/or a Media Access Control layer, as represented by hardware interface 910 shown in FIG. 9), and a higher layer of communication functionality (e.g., IP Networking 920, along with the relevant elements of OS environment 940 and SPN Support 930). In a preferred embodiment, PwrCntl logic 938 determines the SP's current environmental status at the higher layer—including, for example, the current specifics of connectivity/neighborhood, routing information, and topology information. Based on these higher-level networking conditions, logic 938 dynamically adjusts one or more communication parameters pertaining to the lower layer such as channel selection, transmission power, and the contention resolution table. For example, in highly connected networks fair access to a common channel presents a problem of resolving interference/collisions. Thus, if high connectivity (e.g., above certain thresholds as determined by the practitioner) is observed by PwrCntl logic 938 at the higher networking layer, logic 938 can trigger a request to reduce transmission power in the physical layer. By continually monitoring the resulting network topology at the network layer, further power adjustments can be made until there is less interference and more opportunity for multiple simultaneous transmitting units. In similar fashion, PwrCntl logic 983 might intervene to switch the transmitting frequency of the SP, or to adjust the MAC-layer contention resolution table, in order to mitigate the problems of collisions and interference indicated by the higher-layer networking environment conditions. In this way, physical layer communication parameters for one or more members of a Service Point Network may be dynamically and intelligently adjusted based on current environmental conditions at the higher networking layer (e.g., topology and routing considerations).

SP's forming an SPN can preferably provide access to a potentially broad range of communication or networking services, such as: distributed applications, printing, gateways, DHCP, SMTP, vending, audio, imaging, lighting, utilities, appliances, travel, communications, telematics, and location-based services. These functional services and others may be delivered advantageously through deployment of Service Points within ubiquitous devices such as light fixtures, phones, monitors, parking meters, signal lights, and vending machines.

Also note that while aspects of the preferred embodiment were described with respect to a wireless LAN for illustrative purposes (as in FIG. 4), practitioners will readily appreciate that the teachings and benefits of the present invention may similarly be applied to wireless MAN and WAN environments and markets.

Figure 10:
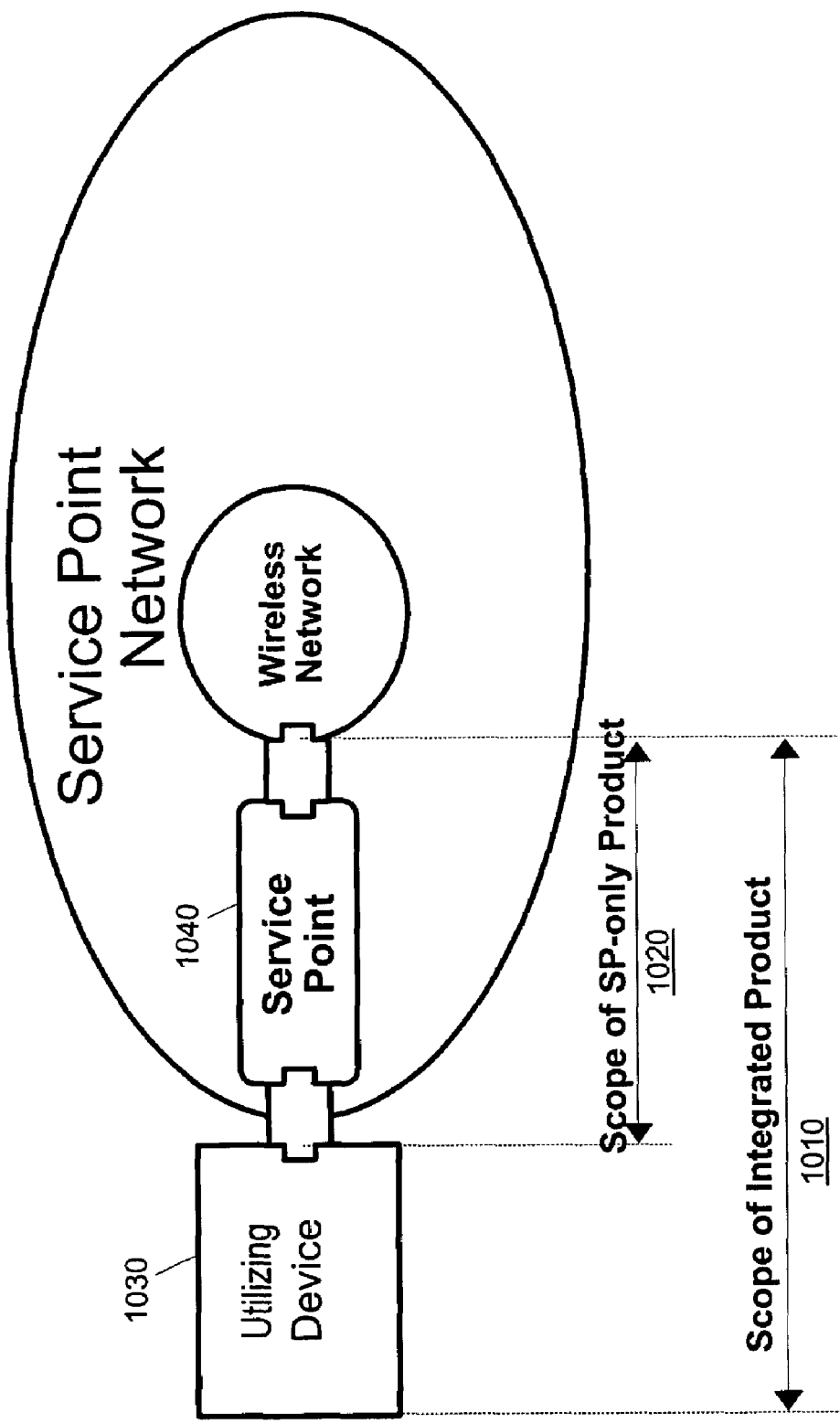
FIG. 10 shows an architectural overview for the integration of an SP device with a Utilizing Device.

As illustrated in FIG. 10, for some embodiments and applications it may be advantageous to physically integrate Utilizing Device 1030 with Service Point 1040 as a single product 1010, such that they share certain common components (e.g., power supply). Even then, Service Point 1040 remains functionally and logically separated from Utilizing Device 1030. For example, an attractive product might be a combined Wireless Access Point and a Service Point (SP/AP). Here are three levels of integration that could be considered for combining these products:

Separate boxes for SP and AP, with an Ethernet connection between them

Separate PC boards for SP and AP, in a common box with a PCI adaptor connection between them Separate application processes for SP and AP, with a socket interface connection between them.

Practitioners, of course, may select appropriate levels of integration depending upon the requirements and considerations of particular applications and circumstances.

Figure 11:
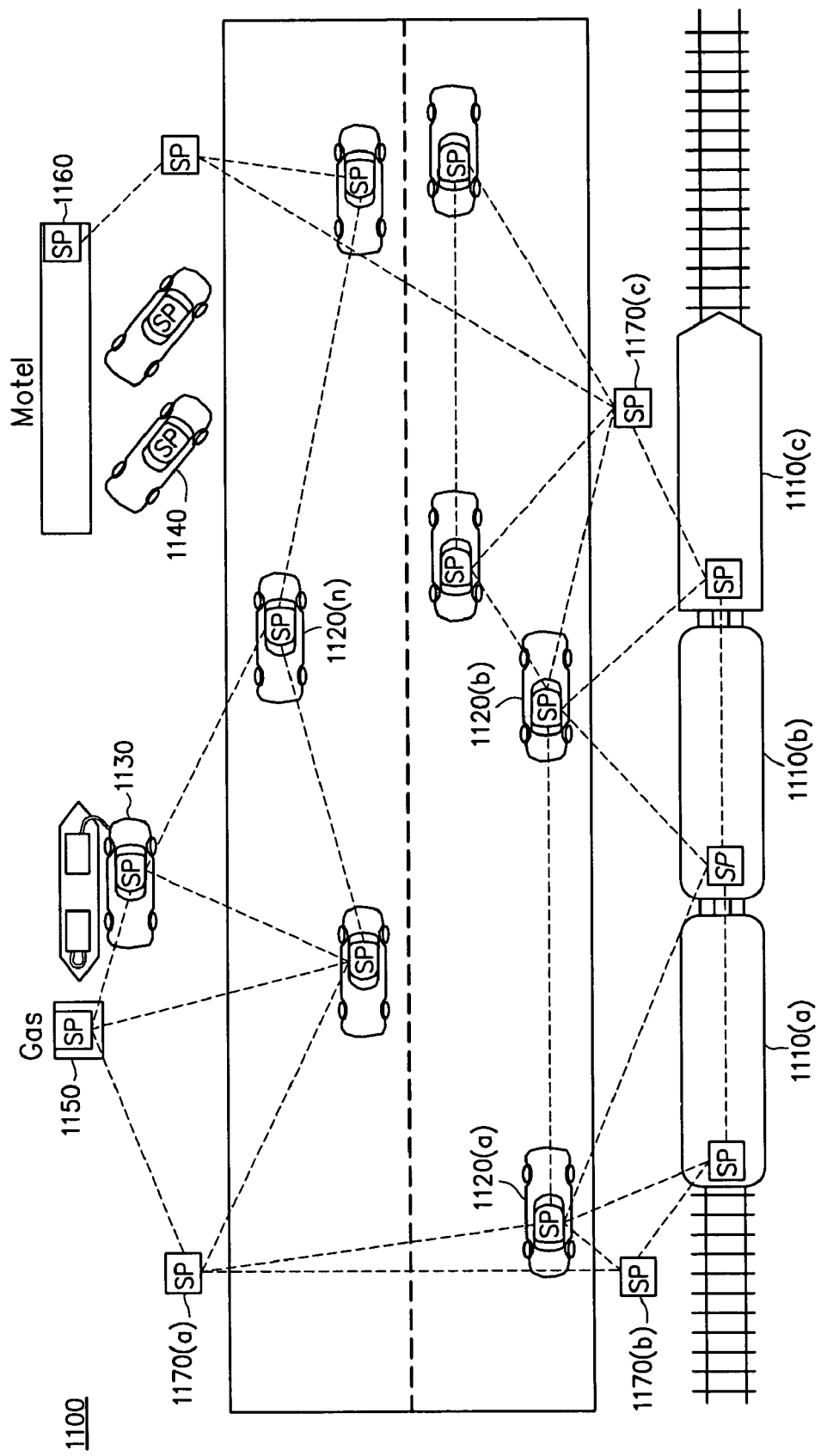
FIG. 11 illustrates a mobile SPN embodiment.

Mobile Service Points, illustrated in FIG. 11, change the way wireless networking can be designed, enabling the mobility of entire networks as opposed to the mobility of solely client-utilizing nodes. As shown in FIG. 11, mobile SPN 100 includes and opportunistically leverages a combination of independently deployed SP's including: mobile SP nodes 1120(*a*)-(*n*) deployed in moving automobiles; mobile SP nodes 1110(*a*)-(*c*) deployed in a moving train; mobile SP node 1130 deployed in a currently parked car; and fixed SP nodes 1150, 1160 and 1170(*a*)-(*c*) that have been deployed in the area e.g., by a local merchant (gas station, motel, and utilities). (Note also node 1140 deployed in a parked vehicle and not participating in SPN 1100, because for example it is not powered on). Mobile SPN 1100 is opportunistically formed by the ad hoc, self-configured networking of these nodes. As the vehicles hosting the various mobile nodes move away in various directions, SPN 1100 will be reformed in an ad hoc manner, and may be replaced by multiple distinct mobile VPNs depending on where groups of active SP's congregate and organize themselves at any given time.

In light of the teachings herein, practitioners will recognize and can develop a wide range of services designed to exploit Service Point mobility.

Other embodiments are within the scope of the following claims.

What is claimed is:

1. A method of communicating among client devices via a network, the network having an associated address domain and including nodes adapted to communicate with at least one of the client devices, addresses being defined as internal and external with respect to the domain, the method comprising:

wirelessly ad hoc communicating among at least some of the nodes, each node having at least one respective identifier and at least one internal address;

for each client device, establishing communications and a respective association with at least one of the nodes, each client device having a respective external address;

in a source client device of the client devices transmitting to the network data intended for at least one destination client device of the client devices;

internal to the network and transparent to the client devices, each node associated with each intended destination client device being a destination node and its at least one respective identifier being a destination identifier, and determining each destination identifier corresponding to each intended destination client device, determining the internal address of each destination node, and routing communications to each destination node using each determined internal address, at least some of the communications being routed to each destination node including at least the transmitted data intended for the associated destination client device and address information regarding the destination node;

each intended destination client device receiving the data transmitted by the source client device; and wherein the address information regarding each destination node is not provided to the source client device.

2. The method of claim 1, wherein the network carries Internet Protocol traffic.

3. The method of claim 1, wherein at least some of the network nodes communicate with each other using an ad hoc mesh network protocol.

4. The method of claim 3, wherein at least some of the network nodes communicate with each other using an on-demand routing protocol.

5. The method of claim 3, wherein at least some of the network nodes communicate with each other using a pro-active routing protocol.

6. The method of claim 1, wherein at least some of the network nodes communicate with each other using a network protocol supporting one or more of the following types of routing: unicast, multi-cast, and broadcast.

7. The method of claim 1, wherein said ad hoc network is ad hoc with respect to the number of the nodes.

8. The method of claim 1, wherein said ad hoc network is ad hoc with respect to the location of the nodes.

9. The method of claim 1, wherein said ad hoc network is ad hoc with respect to an environment surrounding the nodes.

10. The method of claim 1, wherein said ad hoc network is ad hoc with respect to the communications between the client devices and the nodes.

11. The method of claim 1, wherein the nodes are embodied in physically mobile nodes.

12. The method of claim 1, wherein the communications between each client device and its at least one associated node includes wired communications.

13. The method of claim 1, wherein the communications between each client device and its at least one associated node includes wireless communications.

14. The method of claim 1, wherein at least one of the nodes is in communications with a plurality of the client devices.

15. The method of claim 1, wherein at least one of the nodes is integrated in combination with at least one of the client devices such that the integrated combination shares one or more common components.

16. The method of claim 15, wherein the integrated combination is a wireless access point.

17. The method of claim 1, wherein each of the nodes is configured to serve in multiple topological roles.

18. The method of claim 17, wherein said multiple topological roles include one or more of the following: leaf node and trunk node.

19. The method of claim 1, wherein the network further includes at least one private sub-net including a selected subset of the nodes, each of the selected nodes being configured to only forward communications traffic that is either to or from other ones of the selected nodes.

20. The method of claim 1, further including automatically reorganizing the network into one or more sub-nets.

21. The method of claim 20, wherein said automatic reorganization into sub-nets is based at least partly upon one or more of the following factors: routing, routing management, security management, frequency, authentication, density, identification, age, technologies.

22. The method of claim 1, wherein the address information comprises the determined internal address.

23. The method of claim 22, further including dynamically repeating the act of determining the internal address at least subsequent to changes to the internal address of the destination node.

24. The method of claim 1, wherein the client devices provide a set of resources including: applications, printing, network gateway, Dynamic Host Configuration Protocol (DHCP), Simple Mail Transfer Protocol (SMTP), vending/e-commerce, audio, imaging, lighting, utility, appliances, travel, communications, telematics, and emergency/safety.

25. The method of claim 1, wherein the destination client device is selected for communications with the source client device, the destination client device being selected from among one or more candidate client devices in part based on a topological relation between the at least one node associated with the source client device and the at least one node associated with the destination client device.

26. The method of claim 1, wherein the destination client device is selected for communications with the source client device, the destination client device being selected from among one or more candidate client devices in part based on the location of the at least one node associated with the destination client device.

27. The method of claim 1, wherein the nodes are service points (SP), the network is a service point network (SPN), the client devices are utilizing devices, the identifiers are port IDs, the source client device is an originator utilizing device associated with an entry SP, the destination client device is a destination utilizing device associated with a terminal SP, and each destination identifier is the port ID of a service port of each terminal SP.

28. The method of claim 1, wherein at least some of the time the network behaves as a distributed switch to the client devices.

29. The method of claim 1, wherein the act of determining the internal address is repeated at least once during the act of routing to accommodate one or more destination node internal address changes.

30. The method of claim 29, wherein the act of determining the internal address is performed at each intermediate routing hop within the network.

31. The method of claim 1, wherein the node associated with the source client device is a source node and the act of determining the internal address is performed at least in the source node.

32. The method of claim 31, wherein the source node determines the internal address based at least in part upon an external address provided with the data transmitted by the source client device.

33. The method of claim 1, wherein the act of determining the internal address is performed at least in part using a mapping table indexed at least in part by external address, a lookup in the table being performed based at least in part upon an external address provided with the data transmitted by the source client device.

34. The method of claim 33, wherein the lookup is performed by at least the node associated with the source client device.

35. The method of claim 34, wherein an instance of the table is stored at least in the node associated with the source client device.

36. The method of claim 34, wherein an instance of the table is stored in each node.

37. The method of claim 33, wherein the result of each lookup includes a destination identifier, an internal address distinct from the destination identifier, and an encryption key.

38. The method of claim 1, wherein each destination node is adapted to not disclose to the destination client device any one or more of: the destination identifier, the internal address of the destination node, and the internal address of the source node.

39. A system for accessing resources in conjunction with client devices external to the system, the system comprising:
 a wireless communication network comprising a plurality of nodes, each node of the plurality of nodes comprising:
  at least one network-side port adapted to wirelessly route multi-hop traffic via the network, and
  at least one client-side port adapted to communicate and be associated with at least one of the client devices, and
 wherein each node of the plurality of nodes is adapted such that
  each client device becomes associated with at least one of the client-side ports and thereby each client device becomes associated with at least one of the nodes,
  each client device communicates over the network via its at least one associated client-side port,
  terminal identifiers corresponding to the client devices are mapped to addresses of the associated nodes,
  the traffic through the network is routed based on the terminal identifier mapped addresses of the associated nodes, at least some of the traffic through the network comprising data and addressing information, a source client device of the client devices being the origin of the data; at least one of the client devices being a destination client device intended to receive the data, the addressing information pertaining to the at least one node associated with each destination client device, and the mapping and the routing are done in a manner transparent to the client devices, none of the addressing information being provided to the source client device.

40. A node adapted for use in a wireless network and in conjunction with client devices considered external to the network, the network including a plurality of the nodes, each node comprising:

at least one network-side port adapted to wirelessly route multi-hop traffic via the network;

at least one client-side port adapted to communicate and be associated with at least one of the client devices, and wherein each node is adapted such that each client device becomes associated with at least one of the client-side ports and thereby each client device becomes associated with at least one of the nodes, each client device communicates over the network via its at least one associated client-side port, terminal identifiers corresponding to the client devices are mapped to addresses of the associated nodes, the traffic through the network is routed based on the terminal identifier mapped addresses of the associated nodes, at least some of the traffic through the network comprising data and addressing information, a source client device of the client devices being the origin of the data, at least one of the client devices being a destination client device intended to receive the data, the addressing information pertaining to the at least one node associated with each destination client device, and the mapping and the routing are done in a manner transparent to the client devices, none of the addressing information being provided to the source client device.

41. The node of claim 40, wherein the client devices address their associated client-side ports of the network using a single common IP address configured for all client-side ports.

42. The node of claim 40, wherein the at least one network-side port is a plurality of network-side ports.

43. The node of claim 40, wherein the at least one client-side port is a plurality of client-side ports.

* * * * *